Figure 1:
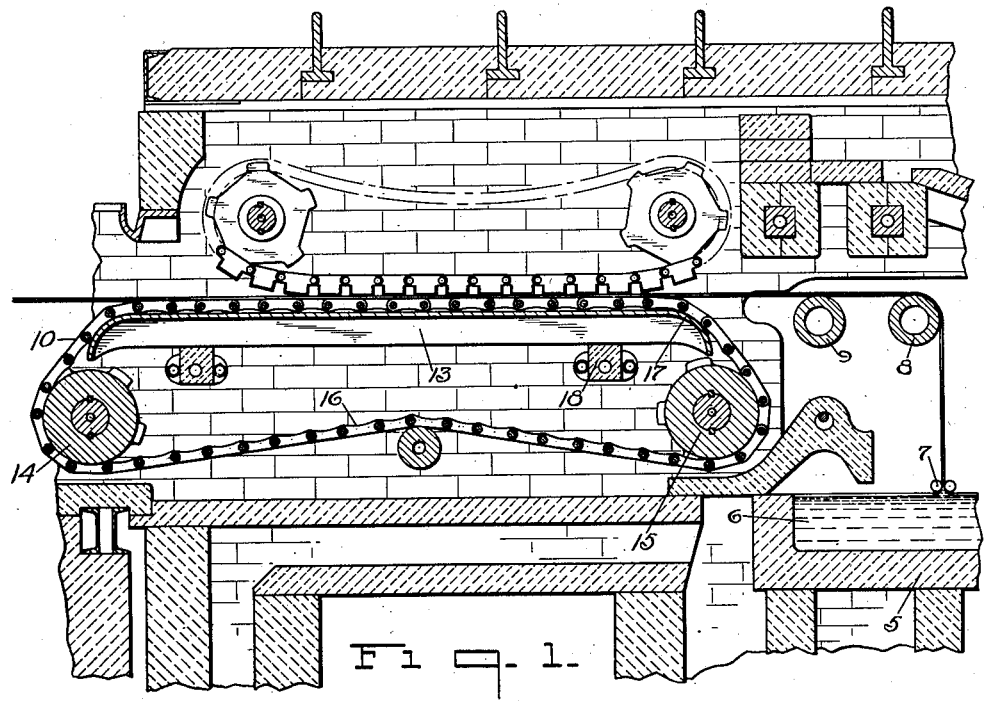

July 5, 1927.

J. L. DRAKE

DRAW TABLE RAIL

Filed Oct. 13, 1924

1,634,827

INVENTOR.
John L. Drake.
Frank Fraser
ATTORNEY.

Patented July 5, 1927.

1,634,827

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

DRAW-TABLE RAIL.

Application filed October 13, 1924. Serial No. 743,215.

This invention relates to improvements in the art of drawing sheet glass, and more particularly to an improved form of draw-table rail for use in combination with a drawing and flattening table for the continuous glass sheet.

In certain forms of sheet glass drawing apparatus, for example that disclosed in Colburn Patent 1,248,809, granted December 4, 1917, the sheet of glass, after being drawn vertically from the molten source, is bent into the horizontal plane about a rotating bending roll, passed onto the flat upper surface of a horizontally traveling table or conveyor. This flattening table comprises an endless flexible belt consisting of a series of pivotally connected metallic links, the belt passing about a pair of supporting drums at the two ends of the loop, and the upper sheet carrying run of the belt being slidably supported on the flat upper surface of a stationary table mounted between the two drums. This table is composed of a plurality of so-called draw-table rails. The plastic glass sheet is carried by the flat upper surface of this link belt and settles thereupon, becoming absolutely flat while being carried along and with the conveyor belt. The friction of the sheet resting upon the traveling table serves to provide a tractive pull for drawing the glass sheet from its molten source. This frictional engagement with the table may be increased if necessary by providing a second endless drawing member which rests its weight upon the upper surface of the glass while the sheet is upon the link conveyor belt.

It is obviously essential that the upper sheet supporting surface of the upper run of the link belt be absolutely flat and horizontal at all times when in contact with the glass, or that any deviations from this flat horizontal condition be downwardly from the sheet so that at no time does any portion of any link extend above the level of the horizontal run of the glass, else the deviations from this plane will be transferred to and cause impressions in the plastic glass sheet which rests thereupon. With many forms of belts heretofore in use, impressions or defects in the glass sheet have sometimes been caused by the failure of the links in the belt to pass from the curved end portions of their orbit into the upper flat horizontal portion or from this upper run into the other curved end portion of their orbit without buckling up or projecting into the horizontal plane occupied by the plastic glass sheet. The reasons for this lifting of the ends of the links at the ends of the run of the belt will be explained in detail hereinafter.

An important object of this invention is to provide a draw-table rail that will make it possible for the conveyor belt to work continuously without in any way causing the links to form an impression upon the sheet as it is being drawn.

Another very important object of the invention is to provide a form of draw-table rail in which a plurality of the rails can be associated together to form a single table, the said rails having suitable means to permit a link to be passed thereover without causing any damage to the lower surface of the sheet as it is drawn from the pot.

Other objects and advantages of the invention will become apparent during the course of the following description.

In the drawings wherein like numeral are employed to designate like parts throughout the same.

Figure 2:
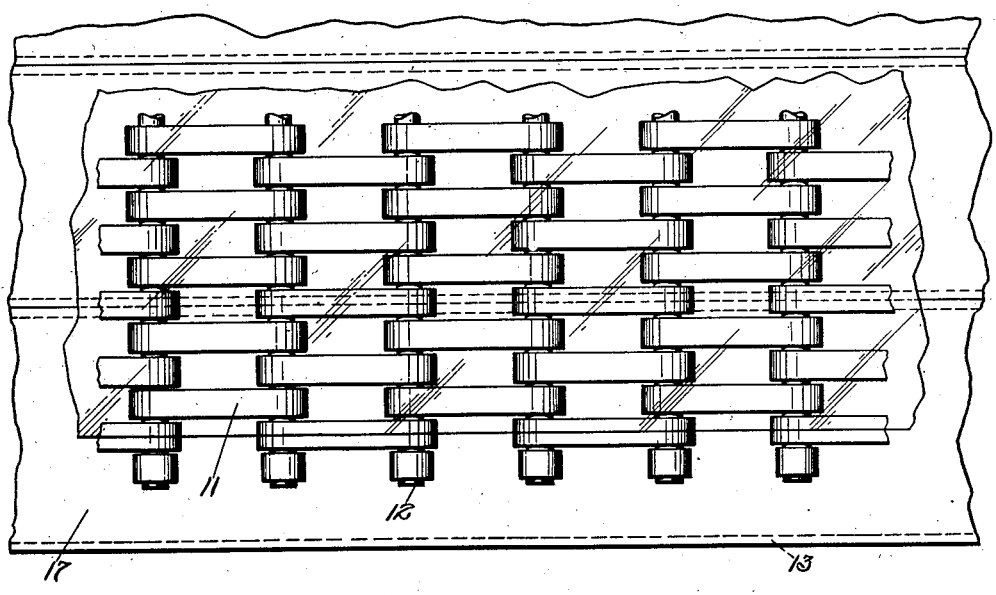

Fig. 1 is a fragmentary longitudinal section taken through a form of sheet glass drawing apparatus, illustrating the invention in use, and Fig. 2 is a fragmentary plan view of the device.

In the drawings wherein for the purposes of illustration is shown the preferred embodiment of the invention, the numeral 5 designates a draw-pot which contains a source of molten glass 6. The glass 6 is drawn from the pot 5 between knurled rollers 7 over a so-called bending roll 8, idler roll 9, and endless flexible conveyor belt 10. The flattening table comprises a series of links 11 arranged in an overlapping and intermeshing relation with their ends pivoted on continous cross shafts 12 which extend completely across the width of the belt. The sheet of glass rests upon the upper flat horizontal surface of the links as shown in Fig. 1. During the upper horizontal sheet carrying run of this belt it travels along and slides upon the draw-table rails 13, which are positioned within the belt loop. At the ends of the loop the link belt travels around a pair of supporting drums 14 and 15 rotatably supported adjacent the ends of the draw-table rails 13. Sprocket wheels arranged at suitable intervals in the respective drums 14 and 15 have their teeth projecting into the spaces between certain of the links to drive the same. The lower surfaces of the links 11 are arcuated as at 16 in accordance with the joint patent of John L. Drake and Louis D. Blackshere, No. 1,529,243 of Mar. 10, 1925. The draw-table rails 13 terminate in the downwardly curved ends 17 which are formed on the same radius as the curved surface 16 on the links 11, and also the radius of the drums 14 and 15.

In using the present form of draw-table rails the drums 14 and 15 are positioned relatively lower than the drums now in use, that is to say they are spaced further away from the sheet when it is in its horizontal plane. The conveyor belt above described is then formed from a plurality of overlapping and intermeshing links which have an under-surface 16 curved on the same radius as the radius of the drums 14 and 15. The table is then made up from a plurality of the rails 13 and are supported upon the cross beams 18. In view of the fact that the rails 13 terminate in the downwardly curved ends, being curved on the same radius as the radius of the drums 14 and 15, it will be seen that the links 11 comprising the conveyor belt can ride around the drums and over the ends of the rails without going off at a tangent, to accommodate themselves to the change in plane. It will be seen in Fig. 1 that the horizontal plane of the sheet as it is drawn from over the bending roll is not in any way disturbed by the movement of the links over the draw-table rails, so that it is possible to operate the conveyor belt continuously without marring or in any way destroying the under-surface of the sheet during the flattening operations.

It is to be understood that the form of the invention herewith shown and described is to be taken as the preferred embodiment of the same and that various changes in the shape, size and arrangement of parts may be resorted to without departing from the spirit of the invention or the scope of the sub-joined claims.

Claims:

1. In combination with a drawing and flattening table for sheet glass, comprising a pair of rotary cylindrical drums and a flexible link belt adapted to travel around the drums, of a plurality of rails arranged between the drums, each of said rails having a curved end formed on a radius identical with the radius of the said drums.

2. In combination with a drawing and flattening table for sheet glass, comprising a flexible link belt formed from a plurality of links having a curved under-surface, of a draw-table rail having curved ends, the radius of the curved ends being the same as the radius of the curved under-surface of said links.

Signed at Toledo, in the county of Lucas and State of Ohio, this 10th day of October, 1924.

JOHN L. DRAKE.